(12) United States Patent
Birkby et al.

(10) Patent No.: US 9,103,253 B2
(45) Date of Patent: Aug. 11, 2015

(54) THERMAL ENHANCER AND HYDROCARBON DOSER

(75) Inventors: Nicholas Birkby, Preston (GB); Navin Khadiya, Columbus, IN (US); Wilbur H. Crawley, II, Nashville, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 1234 days.

(21) Appl. No.: 12/639,283

(22) Filed: Dec. 16, 2009

(65) Prior Publication Data

US 2011/0138785 A1 Jun. 16, 2011

(51) Int. Cl.
*F01N 3/00* (2006.01)
*F01N 3/08* (2006.01)
*F01N 3/025* (2006.01)
*F01N 9/00* (2006.01)

(52) U.S. Cl.
CPC .............. *F01N 3/0807* (2013.01); *F01N 3/025* (2013.01); *F01N 9/00* (2013.01); *F01N 2240/14* (2013.01); *Y02T 10/47* (2013.01)

(58) Field of Classification Search
USPC ............... 60/274, 286, 295, 300, 303, 311; 422/170, 171, 172, 177, 182
See application file for complete search history.

(56) References Cited

U.S. PATENT DOCUMENTS

| | | | |
|---|---|---|---|
| 5,711,149 A | 1/1998 | Araki | |
| 6,021,639 A * | 2/2000 | Abe et al. | 60/297 |
| 6,595,003 B2 * | 7/2003 | Dalla Betta et al. | 60/777 |
| 6,615,580 B1 * | 9/2003 | Khair et al. | 60/286 |
| 6,973,778 B2 * | 12/2005 | Kondou et al. | 60/295 |
| 7,032,376 B1 * | 4/2006 | Webb et al. | 60/297 |
| 7,367,182 B2 * | 5/2008 | Takahashi et al. | 60/286 |
| 7,412,822 B2 * | 8/2008 | Zhan et al. | 60/295 |
| 8,037,673 B2 * | 10/2011 | Gonze et al. | 60/284 |
| 2002/0104312 A1 | 8/2002 | Hoffman et al. | |
| 2004/0255588 A1 * | 12/2004 | Lundberg et al. | 60/723 |
| 2005/0000209 A1 | 1/2005 | Takahashi et al. | |
| 2006/0179821 A1 | 8/2006 | Zhan et al. | |
| 2006/0283181 A1 | 12/2006 | Crawley et al. | |
| 2008/0087013 A1 * | 4/2008 | Crawley et al. | 60/320 |
| 2008/0264042 A1 * | 10/2008 | Khadiya | 60/286 |
| 2009/0241520 A1 | 10/2009 | Gendron et al. | |

OTHER PUBLICATIONS

International Search Report, dated Aug. 25, 2011.
Extended European Search Report for PCT Application No. PCT/US2010/059351, dated Mar. 4, 2015.

* cited by examiner

*Primary Examiner* — Jesse Bogue
(74) *Attorney, Agent, or Firm* — Carlson, Gaskey & Olds, PC

(57) ABSTRACT

A catalyst is positioned downstream of a thermal enhancer, such as a fuel-fired burner for example. A doser injects hydrocarbons into the thermal enhancer to maintain exhaust gas temperatures such that the catalyst is in an active condition and to raise exhaust gas temperatures to a level such that a diesel particulate filter can be regenerated.

16 Claims, 1 Drawing Sheet

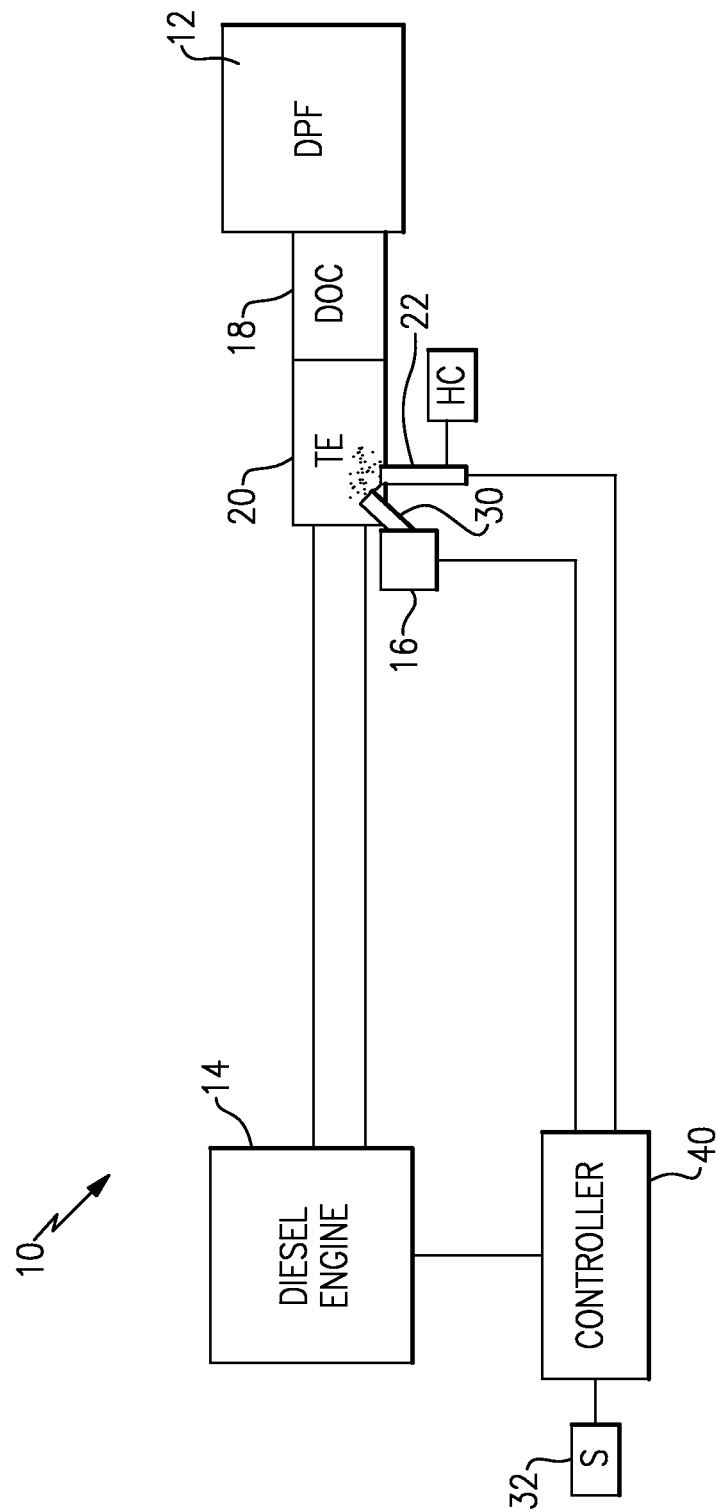

THERMAL ENHANCER AND HYDROCARBON DOSER

TECHNICAL FIELD

The subject invention relates to a thermal enhancer for a vehicle exhaust system, and more particularly to a thermal enhancer with a hydrocarbon doser that raises exhaust gas temperature to regenerate a particulate filter.

BACKGROUND OF THE INVENTION

A thermal enhancer (TE) elevates the exhaust temperature of exhaust gas to activate a catalyst. A diesel particulate filter (DPF) removes soot and other particulate matter from exhaust gases generated by operation of a diesel engine. The DPF can become clogged over time, which decreases engine operating efficiency. The DPF needs to be regenerated to burn off the trapped particulate matter. In certain applications, the TE is not able to elevate the exhaust gas temperature to a level that would allow efficient regeneration for cleaning of the DPF.

SUMMARY OF THE INVENTION

A thermal enhancer (TE), such as a fuel-fired burner for example, uses a doser to inject hydrocarbons into exhaust gases generated by a diesel engine in order to raise exhaust gas temperatures.

In one example, a catalyst is positioned downstream of the thermal enhancer and the doser injects hydrocarbons into the thermal enhancer for multiple purposes. One purpose is to maintain exhaust gas temperatures such that the catalyst is in an active condition. Another purpose is to raise exhaust gas temperatures to a level such that a diesel particulate filter (DPF) can be regenerated.

In one example, the thermal enhancer comprises a fuel-fired partial range burner is used to ignite exhaust gases to raise exhaust gas temperatures to a desired temperature level. A controller operates the fuel-fired burner in one of a plurality of operational modes to control exhaust gas temperatures.

In one example, the plurality of operational modes includes at least a first mode comprising only a burner mode, a second mode comprising a burner and doser mode, and a third mode comprising only a doser mode. The controller operates in the first mode to activate the fuel-fired burner until a light-off temperature of the catalyst is achieved. Subsequent to the catalyst reaching a light-off temperature, the controller operates in the second mode with the fuel-fired burner being activated and the doser adding hydrocarbons to the exhaust gases until a target temperature is achieved, the exhaust temperature exceeds a burner operating temperature, or the fuel-fired burner reaches a rich limit. The controller operates in the third mode with the doser adding hydrocarbons to the exhaust gas as long as the catalyst remains active and hydrocarbons do not continue downstream of the catalyst.

In one example, the catalyst is a diesel oxidation catalyst (DOC), a lean NOx catalyst, or a lean NOx trap.

These and other features of the present invention can be best understood from the following specification and drawings, the following of which is a brief description.

BRIEF DESCRIPTION OF THE DRAWINGS

FIG. 1 is a schematic diagram of a vehicle exhaust system incorporating the subject invention.

DETAILED DESCRIPTION OF THE PREFERRED EMBODIMENT

A vehicle exhaust system 10 includes at least one exhaust component that traps particulate matter, such as a diesel particulate filter (DPF) 12 for example. The DPF 12 remove soot and other types of particulate material from exhaust gases generated by operation of a diesel engine 14. The accumulated soot is continuously removed by reaction with nitrogen dioxide from the engine 14 when exhaust gas temperatures are suitably high. A fuel-fired partial range burner 16 generates heat such that trapped particulate matter in the DPF 12 can be burned off in a regeneration cycle when exhaust gas temperatures are not sufficiently high enough.

The exhaust system 10 also includes a catalyst 18. In one example, the catalyst is a diesel oxidation catalyst (DOC), a lean NOx catalyst, or a lean NOx trap. Nitrogen dioxide is generated from the nitric oxide produced by the engine 14 by a catalytic reaction of the catalyst 18, which is upstream of the DPF 12. The DPF 12 and catalyst 18 can be included within a common housing structure, or could be formed as separate components.

The fuel-fired burner comprises a thermal enhancer (TE) 20 that is included in the exhaust system 10 to raise the catalyst 18 to a light off temperature at which the catalyst 18 is active. The TE 20 also increases exhaust gas temperatures to regenerate the DPF 12 under low exhaust gas temperature operating conditions. The TE 20 can also be located within a common housing with the catalyst 18 and DPF 12, or can be a separate structure.

A doser 22 is included in the TE 20 to add hydrocarbons HC to the exhaust gases. The doser 22 introduces the hydrocarbons HC to react with the catalyst 18 and combusts to increase temperatures at the DPF 12 for regeneration purposes. One nozzle is used for activating the catalyst and for introducing the HCs for regeneration purposes. A second nozzle could be used to additionally supply HCs; however, using a single nozzle provides a more beneficial configuration from a cost and assembly perspective.

However, if the temperatures are still not sufficiently high for regeneration, the fuel-fired partial range burner 16 operates to ignite exhaust gases to raise exhaust gas temperatures to regenerate the DPF 12. In one example, the fuel-fired partial range burner 16 actively operates within the thermal enhancer 20 to increase temperatures. An igniter 30, such as an electrode for example, ignites an exhaust gas/hydrocarbon mixture provided via the doser 22 to elevate exhaust gas temperature.

A controller 40 operates the fuel-fired partial range burner 16 in one of a plurality of operational modes to control exhaust gas temperatures for regeneration of the DPF 12. Sensors 42 measure, monitor, and communicate various exhaust system information to the controller 40 such that the controller 40 can determine which operational mode to activate. These sensors can include temperatures sensors, pressure sensors, engine sensors, etc. for example. Further, the controller 40 can be a separate electronic control unit or microprocessor that is dedicated to the exhaust system 10, or the controller 40 can be integrated into an existing vehicle control unit, such as an engine control unit for example. Further, the controller 40 is programmed with software and is in communication with the various vehicle sensors 42 and vehicle data-links such that controller 40 is provided with sufficient information to determine when the DPF 12 is to be regenerated and which operational mode to activate.

In one example, pressure sensors can be located upstream and downstream of the DPF 12 to monitor a pressure drop across the exhaust component 12. When a pressure differential between these pressure sensors reaches a predetermined criteria or limit, the controller 40 can initiate a regeneration cycle. It should be understood that this is just one example, and that other methods of determining when regeneration should occur could also be used.

In one example, the plurality of operational modes includes at least a first mode comprising only a burner mode where the fuel-fired burner 16 is active, a second mode comprising a burner and doser mode where the burner 16 is active and the doser 22 is supplying an additive to the exhaust gas, and a third mode comprising only a doser mode where the doser 22 is supplying an additive to the exhaust gas. The controller 40 operates in the first mode to activate the fuel-fired burner 16 until a light-off temperature of the catalyst 18 is achieved. Subsequent to the activation of the catalyst 18, the controller 40 operates in the second mode with the fuel-fired burner 16 being activated and the doser 22 adding hydrocarbons HC to the exhaust gases until a target temperature is achieved, the exhaust temperature exceeds a burner operating temperature, or the fuel-fired burner 16 reaches a rich limit. The controller 40 operates in the third mode with the doser 22 adding hydrocarbons HC to the exhaust gas as long as the catalyst is above light-off temperature and hydrocarbons do not continue downstream of the diesel oxidation catalyst, i.e. prevents the hydrocarbons from slipping past the catalyst 18.

Using the TE 20 allows the catalyst 18 to be raised to a temperature where the catalyst 18 is active. This is of a benefit for any type of catalyst that requires a minimum temperature for operation. The TE 20 includes the doser 22 to add hydrocarbons HC to combust catalytically resulting in elevation of the exhaust gas temperature to a level that is sufficient for regeneration. If the exhaust gas is already at a sufficient temperature for the catalyst 18 to be active, the doser 22 only injects hydrocarbons HC to raise the exhaust gas temperature for regeneration of the DPF 12. In a transient operation, the fuel-fired burner 16 would activate and achieve the light-off temperature for the catalyst 18, thus operating in the first mode. Subsequently, the controller 40 switches to the second mode, running the TE rich. When either the exhaust gas temperature exceeds the burner operating range, such as at a temperature of 350° C. for example, or if the fuel-fired burner 16 reaches a rich limit, the controller 40 switches to the third mode. The controller 40 then operates in the third mode as long as a hysteresis extended range of the catalyst 18 still keeps hydrocarbons from slipping past the catalyst 18.

The subject invention provides a simple and easy method and apparatus that has the ability to dose hydrocarbons at significantly higher levels compared to prior designs. Further, only a single doser is required to both maintain the catalyst 18 active and to regenerate the DPF 12.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust component assembly comprising:
   a catalyst;
   a fuel-fired burner to raise exhaust gas temperatures to activate the catalyst;
   a doser that injects hydrocarbons into said fuel-fired burner to maintain exhaust gas temperatures such that said catalyst is in an active condition and to raise exhaust gas temperature to temperature levels sufficient to regenerate a diesel particulate filter or to perform another desired reaction on said catalyst; and
   a controller that operates said fuel-fired burner in one of a plurality of operational modes to control exhaust gas temperatures, and wherein said plurality of operational modes includes at least a first mode comprising a burner only mode where said fuel-fired burner is active and said doser is inactive, a second mode comprising a burner and doser mode where said burner is active and said doser is supplying hydrocarbons to said exhaust gas, and a third mode comprising a doser only mode where said doser is supplying hydrocarbons to the exhaust gas and said burner is inactive, and wherein said controller only operates in said second mode subsequent to the catalyst reaching a light-off temperature due to activation of the fuel-fired burner until a predetermined condition is achieved, and wherein said controller initiates the third mode of operation by inactivating the fuel-fired burner once the predetermined condition is achieved.

2. The exhaust component assembly according to claim 1 wherein said catalyst comprises one of a diesel oxidation catalyst, a lean NOx catalyst, or a lean NOx trap and wherein said fuel-fired burner ignites exhaust gases to raise exhaust gas temperatures to a desired temperature level.

3. The exhaust component assembly according to claim 1 wherein the predetermined condition comprises at least one of a target temperature being achieved, the exhaust temperature exceeding a burner operating temperature, or the fuel-fired burner reaching a rich limit.

4. An exhaust component assembly comprising:
   a catalyst;
   a fuel-fired burner to raise exhaust gas temperatures to activate the catalyst;
   a doser that injects hydrocarbons into said fuel-fired burner to maintain exhaust gas temperatures such that said catalyst is in an active condition and to raise exhaust gas temperature to temperature levels sufficient to regenerate a diesel particulate filter or to perform another desired reaction on said catalyst; and
   a controller that operates said fuel-fired burner in one of a plurality of operational modes to control exhaust gas temperatures, and wherein said plurality of operational modes includes at least a first mode comprising a burner only mode where said fuel-fired burner is active and said doser is inactive, a second mode comprising a burner and doser mode where said burner is active and said doser is supplying hydrocarbons to said exhaust gas, and a third mode comprising a doser only mode where said doser is supplying hydrocarbons to the exhaust gas and said burner is inactive, and wherein said controller determines if an exhaust gas temperature is sufficient to achieve activation of said catalyst, and wherein if said exhaust gas temperature is not sufficient to achieve activation of said catalyst said controller operates in said first mode to activate only said fuel-fired burner until a light-off temperature of said catalyst is achieved, and wherein if said exhaust gas temperature is sufficient to achieve activation of said catalyst said controller operates in said third mode.

5. The exhaust component assembly according to claim 4 wherein, subsequent to said catalyst reaching a light-off temperature due to activation of said fuel-fired burner, said controller operates in said second mode with said fuel-fired burner being activated and said doser adding hydrocarbons to said exhaust gases until a target temperature is achieved, said exhaust temperature exceeds a burner operating temperature, or said fuel-fired burner reaches a rich limit.

6. An exhaust component assembly comprising:
a catalyst;
a fuel-fired burner to raise exhaust gas temperatures to activate the catalyst;
a doser that injects hydrocarbons into said fuel-fired burner to maintain exhaust gas temperatures such that said catalyst is in an active condition and to raise exhaust gas temperature to temperature levels sufficient to regenerate a diesel particulate filter or to perform another desired reaction on said catalyst; and
a controller that operates said fuel-fired burner in one of a plurality of operational modes to control exhaust gas temperatures, and wherein said plurality of operational modes includes at least a first mode comprising a burner only mode where said fuel-fired burner is active and said doser is inactive, a second mode comprising a burner and doser mode where said burner is active and said doser is supplying hydrocarbons to said exhaust gas, and a third mode comprising a doser only mode where said doser is supplying hydrocarbons to the exhaust gas and said burner is inactive, and wherein said controller operates in said third mode with said doser adding hydrocarbons to said exhaust gas as long as said catalyst is above light-off temperature and hydrocarbons do not continue downstream of said catalyst.

7. An exhaust component assembly comprising:
a catalyst;
a fuel-fired burner to raise exhaust gas temperatures to activate the catalyst;
a doser that injects hydrocarbons into said fuel-fired burner to maintain exhaust gas temperatures such that said catalyst is in an active condition and to raise exhaust gas temperature to temperature levels sufficient to regenerate a diesel particulate filter or to perform another desired reaction on said catalyst;
a controller that operates said fuel-fired burner in one of a plurality of operational modes to control exhaust gas temperatures, and wherein said plurality of operational modes includes at least a first mode comprising a burner only mode where said fuel-fired burner is active and said doser is inactive, a second mode comprising a burner and doser mode where said burner is active and said doser is supplying hydrocarbons to said exhaust gas, and a third mode comprising a doser only mode where said doser is supplying hydrocarbons to the exhaust gas and said burner is inactive; and
wherein said controller determines:
if an exhaust gas temperature is sufficient to achieve activation of said catalyst, and if said exhaust gas temperature is not sufficient to achieve activation of said catalyst said controller operates in said first mode to activate only said fuel-fired burner until a light-off temperature of said catalyst is achieved, and
wherein, subsequent to said catalyst reaching a light-off temperature due to activation of said fuel-fired burner, said controller operates in said second mode with said fuel-fired burner being activated and said doser adding hydrocarbons to said exhaust gases until a target temperature is achieved, said exhaust temperature exceeds a burner operating temperature, or said fuel-fired burner reaches a rich limit, and
wherein said controller operates in said third mode with said doser adding hydrocarbons to said exhaust gas as long as said catalyst is above light-off temperature and hydrocarbons do not continue downstream of said catalyst.

8. An exhaust component assembly comprising:
a catalyst;
a fuel-fired burner to raise said catalyst to a temperature at which said catalyst is active;
a diesel particulate filter that collects particulate matter from exhaust gases, wherein fuel-fired burner increases exhaust gas temperatures to regenerate said diesel particulate filter;
a doser that adds hydrocarbons to exhaust gases within said fuel-fired burner;
a controller that operates said fuel-fired burner in one of a plurality of operational modes to control exhaust gas temperatures for regeneration of said diesel particulate filter, and wherein said plurality of operational modes includes at least a first mode comprising a burner only mode where said fuel-fired burner is active and said doser is inactive, a second mode comprising a burner and doser mode where said burner is active and said doser is supplying hydrocarbons to said exhaust gas, and a third mode comprising a doser only mode where said doser is supplying hydrocarbons to the exhaust gas and said burner is inactive; and
wherein said controller determines:
if an exhaust gas temperature is sufficient to achieve activation of said catalyst, and wherein if said exhaust gas temperature is not sufficient to achieve activation of said catalyst said controller operates in said first mode to only activate said fuel-fired burner until a light-off temperature of said catalyst is achieved, and
wherein, subsequent to said catalyst reaches a light-off temperature due to activation of said fuel-fired burner, said controller operates in said second mode with said fuel-fired burner being activated and said doser adding hydrocarbons to said exhaust gases until a target temperature is achieved, said exhaust temperature exceeds a burner operating temperature, or said fuel-fired burner reaches a rich limit, and
wherein said controller operates in said third mode with said doser adding hydrocarbons to said exhaust gas as long as said catalyst is above light-off temperature and hydrocarbons do not continue downstream of said catalyst.

9. The exhaust component assembly according to claim 8 wherein said catalyst comprises one of a diesel oxidation catalyst, a lean NOx catalyst, or a lean NOx trap and wherein said catalyst is downstream of said fuel-fired burner.

10. A method of operating an exhaust treatment component comprising:
positioning a catalyst downstream of a fuel-fired burner;
associating a doser with the fuel-fired burner to inject an additive into the exhaust gas upstream of the catalyst;
determining if an exhaust gas temperature is sufficient to achieve activation of the catalyst;
initiating a first mode of operation by activating only the fuel-fired burner if the exhaust gas temperature is not sufficient to achieve activation of the catalyst while the doser remains inactive;
selectively injecting the additive with the doser to maintain exhaust gas temperatures such that the catalyst is in an active condition and to raise exhaust gas temperature to temperature levels such that a diesel particulate filter can be regenerated;
operating the fuel-fired burner in one of a plurality of operational modes to control exhaust gas temperatures, and wherein the plurality of operational modes includes at least the first mode of operation which comprises a burner only mode where the fuel-fired burner is active and the doser is inactive, a second mode of operation comprising a burner and doser mode where the burner is active and the doser is supplying the additive to said exhaust gas, and a third mode of operation comprising a doser only mode where the doser is supplying the additive to the exhaust gas and the fuel-fired burner is inactive; and operating in the second mode, subsequent to the catalyst reaching a light-off temperature due to activation of the fuel-fired burner, with both the fuel-fired burner and doser being activated until a predetermined condition is achieved, and including initiating the third mode of operation by inactivating the fuel-fired burner once the predetermined condition is achieved.

11. The method according to claim 10 wherein the predetermined condition comprises at least one of a target temperature being achieved, the exhaust temperature exceeding a burner operating temperature, or the fuel-fired burner reaching a rich limit.

12. A method of operating an exhaust treatment component comprising:

positioning a catalyst downstream of a fuel-fired burner;
associating a doser with the fuel-fired burner to inject an additive into the exhaust gas upstream of the catalyst;
determining if an exhaust gas temperature is sufficient to achieve activation of the catalyst;
initiating a first mode of operation by activating only the fuel-fired burner if the exhaust gas temperature is not sufficient to achieve activation of the catalyst while the doser remains inactive;
selectively injecting the additive with the doser to maintain exhaust gas temperatures such that the catalyst is in an active condition and to raise exhaust gas temperature to temperature levels such that a diesel particulate filter can be regenerated;
operating the fuel-fired burner in one of a plurality of operational modes to control exhaust gas temperatures, and wherein the plurality of operational modes includes at least the first mode of operation which comprises a burner only mode where the fuel-fired burner is active and the doser is inactive, a second mode of operation comprising a burner and doser mode where the burner is active and the doser is supplying the additive to said exhaust gas, and a third mode of operation comprising a doser only mode where the doser is supplying the additive to the exhaust gas and the fuel-fired burner is inactive; and
operating in the first mode to only activate the fuel-fired burner until a light-off temperature of the catalyst is achieved.

13. A method of operating an exhaust treatment component comprising:

positioning a catalyst downstream of a fuel-fired burner;
associating a doser with the fuel-fired burner to inject an additive into the exhaust gas upstream of the catalyst;
determining if an exhaust gas temperature is sufficient to achieve activation of the catalyst;
initiating a first mode of operation by activating only the fuel-fired burner if the exhaust gas temperature is not sufficient to achieve activation of the catalyst while the doser remains inactive;
selectively injecting the additive with the doser to maintain exhaust gas temperatures such that the catalyst is in an active condition and to raise exhaust gas temperature to temperature levels such that a diesel particulate filter can be regenerated;
operating the fuel-fired burner in one of a plurality of operational modes to control exhaust gas temperatures, and wherein the plurality of operational modes includes at least the first mode of operation which comprises a burner only mode where the fuel-fired burner is active and the doser is inactive, a second mode of operation comprising a burner and doser mode where the burner is active and the doser is supplying the additive to said exhaust gas, and a third mode of operation comprising a doser only mode where the doser is supplying the additive to the exhaust gas and the fuel-fired burner is inactive; and
operating in the second mode, subsequent to the catalyst reaching a light-off temperature due to activation of the fuel-fired burner, with the fuel-fired burner being activated and the doser adding hydrocarbons to the exhaust gases until a target temperature is achieved, the exhaust temperature exceeds a burner operating temperature, or the fuel-fired burner reaches a rich limit.

14. A method of operating an exhaust treatment component comprising:

positioning a catalyst downstream of a fuel-fired burner;
associating a doser with the fuel-fired burner to inject an additive into the exhaust gas upstream of the catalyst;
determining if an exhaust gas temperature is sufficient to achieve activation of the catalyst;
initiating a first mode of operation by activating only the fuel-fired burner if the exhaust gas temperature is not sufficient to achieve activation of the catalyst while the doser remains inactive;
selectively injecting the additive with the doser to maintain exhaust gas temperatures such that the catalyst is in an active condition and to raise exhaust gas temperature to temperature levels such that a diesel particulate filter can be regenerated;
operating the fuel-fired burner in one of a plurality of operational modes to control exhaust gas temperatures, and wherein the plurality of operational modes includes at least the first mode of operation which comprises a burner only mode where the fuel-fired burner is active and the doser is inactive, a second mode of operation comprising a burner and doser mode where the burner is active and the doser is supplying the additive to said exhaust gas, and a third mode of operation comprising a doser only mode where the doser is supplying the additive to the exhaust gas and the fuel-fired burner is inactive; and
operating in the third mode with the doser adding hydrocarbons to the exhaust gas as long as said catalyst is above light-off temperature and hydrocarbons do not continue downstream of the catalyst.

15. A method of operating an exhaust treatment component comprising:

positioning a catalyst downstream of a fuel-fired burner;
associating a doser with the fuel-fired burner to inject an additive into the exhaust gas upstream of the catalyst;
determining if an exhaust gas temperature is sufficient to achieve activation of the catalyst;
initiating a first mode of operation by activating only the fuel-fired burner if the exhaust gas temperature is not sufficient to achieve activation of the catalyst while the doser remains inactive;
selectively injecting the additive with the doser to maintain exhaust gas temperatures such that the catalyst is in an active condition and to raise exhaust gas temperature to temperature levels such that a diesel particulate filter can be regenerated;

operating the fuel-fired burner in one of a plurality of operational modes to control exhaust gas temperatures, and wherein the plurality of operational modes includes at least the first mode of operation which comprises a burner only mode where the fuel-fired burner is active and the doser is inactive, a second mode of operation comprising a burner and doser mode where the burner is active and the doser is supplying the additive to said exhaust gas, and a third mode of operation comprising a doser only mode where the doser is supplying the additive to the exhaust gas and the fuel-fired burner is inactive; and only initiating the second mode of operation in response to the fuel-fired burner alone increasing the exhaust gas temperature to a level sufficient to activate the catalyst.

16. An exhaust component assembly comprising:
a catalyst;
a fuel-fired burner to raise said catalyst temperature which said catalyst is active;
a diesel particulate filter that collects particulate matter from exhaust gases, wherein fuel-fired burner increases exhaust gas temperatures to regenerate said diesel particulate filter;
a doser that adds hydrocarbons to exhaust gases within said fuel-fired burner; and
a controller that operates said fuel-fired burner in one of a plurality of operational modes to control exhaust gas temperatures for regeneration of said diesel particulate filter, and wherein said plurality of operational modes includes at least a first mode comprising a burner only mode where said fuel-fired burner is active and said doser is inactive, a second mode comprising a burner and doser mode where said burner is active and said doser is supplying hydrocarbons to said exhaust gas, and a third mode comprising a doser only mode where said doser is supplying hydrocarbons to the exhaust gas and said burner is inactive, and wherein said controller only operates in said second mode subsequent to the catalyst reaching a light-off temperature due to activation of the fuel-fired burner until a predetermined condition is achieved, and wherein said controller initiates the third mode of operation by inactivating the fuel-fired burner once the predetermined condition is achieved.

* * * * *